(12) United States Patent
Ishikawa et al.

(10) Patent No.: US 9,057,421 B2
(45) Date of Patent: Jun. 16, 2015

(54) WAVE GEAR DEVICE HAVING THREE-DIMENSIONAL CONTACTING INVOLUTE POSITIVE DEFLECTION TOOTH PROFILE

(75) Inventors: Shoichi Ishikawa, Yokohama (JP); Noboru Takizawa, Azumino (JP); Takahiro Arima, Azumino (JP); Yusuke Shibamoto, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 431 days.

(21) Appl. No.: 13/701,336

(22) PCT Filed: Feb. 4, 2011

(86) PCT No.: PCT/JP2011/000644
§ 371 (c)(1),
(2), (4) Date: Nov. 30, 2012

(87) PCT Pub. No.: WO2012/104927
PCT Pub. Date: Aug. 9, 2012

(65) Prior Publication Data
US 2013/0081496 A1 Apr. 4, 2013

(51) Int. Cl.
*F16H 33/00* (2006.01)
*F16H 1/10* (2006.01)
*F16H 55/08* (2006.01)

(52) U.S. Cl.
CPC .............. *F16H 1/10* (2013.01); *Y10T 74/19642* (2013.01); *F16H 55/0833* (2013.01)

(58) Field of Classification Search
CPC .............................. Y10T 74/19; F16H 49/001

USPC ........................................................... 74/640
See application file for complete search history.

(56) References Cited

U.S. PATENT DOCUMENTS 2,906,143 A 9/1959 Musser
4,823,638 A 4/1989 Ishikawa
(Continued)

FOREIGN PATENT DOCUMENTS

JP 45-41171 12/1970
JP 63-115943 A 5/1988
(Continued)

OTHER PUBLICATIONS

International Search Report (PCT/ISA/210) issued on Apr. 26, 2011, by the Japanese Patent Office as the International Searching Authority for International Application No. PCT/JP2011/000644.

*Primary Examiner* — William Kelleher
*Assistant Examiner* — Zakaria Elahmadi
(74) *Attorney, Agent, or Firm* — Buchanan Ingersoll & Rooney PC

(57) ABSTRACT

In a wave gear device, an involute tooth profile with the low pressure angle α (<20°) is employed as a basic tooth profile of external teeth of a flexible external gear. In the principal section of the external teeth, the tooth depth thereof satisfies $2\kappa_0 mn = 2(1+c)$ mn (deflection coefficient $\kappa_0 = 1+c$, $0 < c < 0.5$), which is larger than the standard one. The shifting of the teeth which takes into account coning is performed along the tooth trace direction of the external teeth, so that straight portions of a rack tooth profile on the respective sections perpendicular to the axis in the tooth trace direction of the external teeth are conformed as viewed along the tooth trace direction. The rack tooth profile of the involute tooth profile is a straight line.

4 Claims, 7 Drawing Sheets

(56) References Cited

U.S. PATENT DOCUMENTS

| | | | |
|---|---|---|---|
| 4,974,470 A * | 12/1990 | Ishikawa et al. | 74/640 |
| 2005/0066769 A1* | 3/2005 | Kiyosawa | 74/640 |
| 2007/0180947 A1* | 8/2007 | Ishikawa et al. | 74/640 |
| 2007/0266819 A1* | 11/2007 | Ishikawa et al. | 74/640 |
| 2011/0237382 A1* | 9/2011 | Ishikawa | 475/180 |

FOREIGN PATENT DOCUMENTS

| | | |
|---|---|---|
| JP | 64-079448 A | 3/1989 |
| JP | 05-209655 A | 8/1993 |
| JP | 2005-036937 A | 2/2005 |
| JP | 2007-211907 A | 8/2007 |

* cited by examiner (a)　　　　(b)　　　　(c)

(C)　　　　　(B)　　　　　(A)

WAVE GEAR DEVICE HAVING THREE-DIMENSIONAL CONTACTING INVOLUTE POSITIVE DEFLECTION TOOTH PROFILE

TECHNICAL FIELD

The present invention relates to a wave gear device having a positive deflection tooth profile, in which the amount of bending is greater than a regular amount of bending. In more detail, the present invention relates to a three-dimensional contacting involute positive deflection tooth profile obtained by adopting, as the basic tooth profile of a rigid internal gear and flexible external gear of the wave gear device, an involute tooth profile of a smaller low pressure angle than the standard one, and shifting the external teeth such that straight-line portions of the involute tooth profile of the axis-perpendicular cross sections of the external teeth are conformed, as viewed in the tooth trace direction of the external teeth of the flexible external gear.

BACKGROUND ART

Since the invention of the wave gear device by C. W. Musser (Patent Document 1) up to the present day, inventions for devices of various types have been conceived by its originator, as well as by numerous researchers, including the present inventors. Even limiting the discussion to inventions relating to the tooth profile, numerous different types have been proposed. For example, the present inventors proposed in Patent Document 2 an involute tooth profile for the basic tooth profile of a wave gear device; and in Patent Documents 3 and 4 proposed a tooth profile design method in which a method whereby meshing of a rigid internal gear and a flexible external gear of a wave gear device is approximated by a rack is employed, to derive a cusp tooth profile whereby the two gears contact over a wide area. In Patent Document 5, the present inventors further proposed a tooth profile of high ratcheting torque, making possible continuous meshing in a wave gear device.

Ordinarily, a wave gear device has a ring-shaped rigid internal gear, a flexible external gear disposed coaxially to the inside thereof, and a wave generator fitted inside thereof. The flexible external gear is provided with a flexible cylindrical barrel portion, a diaphragm extending in a radial direction from the rear end of this cylindrical barrel portion, and external teeth formed on the outside peripheral face section of the cylindrical barrel portion at the front end opening side thereof. The flexible external gear that forms in a state in which the diaphragm has closed off the rear end opening of the cylindrical barrel portion is termed a cup-shaped flexible external gear, while the flexible external gear that forms in a state in which the diaphragm has extended outward from the rear end of the cylindrical barrel portion is termed a silk-hat-shaped flexible external gear. The flexible external gear of either shape is deflected to an ellipsoidal shape by the wave generator, whereupon the external teeth formed on the outside peripheral face section of the cylindrical barrel portion thereof mesh with the internal teeth of the rigid internal gear, at either end in the long axis direction of the ellipse.

When the flexible external gear is deformed to an ellipsoidal shape by the wave generator, the rim-neutral circle of the external teeth of the flexible external gear in question deforms to a rim-neutral curve of ellipsoidal shape as well. Where w denotes the amount of bending in a radial direction with respect to the rim-neutral circle prior to deformation at a long axis position of this rim-neutral curve, and $w_0$ denotes a regular (standard) amount of bending, which is the value of the radius of the rim-neutral circle divided by the reduction ratio of the wave gear device, the ratio ($w/w_0$) thereof being the deflection coefficient $\kappa$. An amount of bending greater than the regular amount of bending ($\kappa > 1$) is termed positive deflection, whereas an amount of bending less than the regular amount of bending ($\kappa < 1$) is termed negative deflection.

Here, the external teeth of the flexible external gear having been bent into an ellipsoidal shape, exhibit an increasing amount of bending in a manner substantially proportional to the distance from the diaphragm, going in the tooth trace direction thereof from the rear end portion at the diaphragm side towards the front end portion at the front opening side. Moreover, in association with rotation of the wave generator, sections of the external teeth of the flexible external gear bend repeatedly in a radial direction. Consequently, for example, when the amount of bending in an axis-perpendicular cross section at the center in the tooth trace direction of the external teeth is set to the regular amount of bending ($\kappa = 1$), a state of positive deflection bending arises at the side towards the front end therefrom, and a state of negative deflection bending arises at the side towards the rear end therefrom. An external tooth profile in which the external teeth are in a state of positive deflection bending along the entirety thereof in the tooth trace direction is termed a positive deflection tooth profile, and an external tooth profile in which the external teeth are in a state of negative deflection bending along the entirety thereof in the tooth trace direction is termed a negative deflection tooth profile.

"Coning" describes a state in which sections of the flexible external gear are bent by the wave generator in this fashion. To date, sufficient account has not been given to a rational method for setting the tooth profile, while taking coning of the external teeth into account. Currently, strong demand for improved load torque performance of wave gear devices exists in the marketplace. To achieve this, there is a need for a rational tooth profile that takes coning of the external teeth into account, whereby continuous meshing is possible over the entire tooth trace.

One of the requirements for a wave gear device is that countermeasures be provided against ratcheting at high reduction ratios. In the case of a high reduction ratio in which the number of teeth exceeds 200, it is necessary to increase the tooth height in order to prevent ratcheting during torque at high load.

PRIOR ART DOCUMENTS

Patent Documents

Patent Document 1: U.S. Pat. No. 2,906,143
Patent Document 2: JP-B2 45-41171
Patent Document 3: JP-A 63-115943
Patent Document 4: JP-A 64-79448
Patent Document 5: JP-A 2007-211907

DISCLOSURE OF THE INVENTION

Problems to be Solved by the Invention

It is an object of present invention to provide a wave gear device having a three-dimensional contacting involute positive deflection tooth profile, whereby the two gears maintain meshing over a wide range in a principal cross section (axis-perpendicular cross section) established at a predetermined position in the tooth trace direction, while retaining partial meshing in other axis-perpendicular cross sections in the tooth trace direction as well, the tooth profile provided with a tooth depth large enough that it is possible to prevent ratcheting of the two gears during torque at high load, even at a high reduction ratio.

Means Used to Solve the Above-Mentioned Problems

In order to achieve the aforedescribed object, in the wave gear device of the present invention, an involute positive deflection tooth profile of a low pressure angle of less than 20° is adopted as the basic tooth profile, in order to increase the effective tooth depth. Moreover, focusing on the fact that the rack tooth profile of the involute tooth profile is a straight line, a tooth profile whereby continuous meshing, taking into account coning of the teeth, is possible across the entire tooth trace of the two gears is achieved. Specifically, according to the present invention, the value of the tooth depth in a standard axis-perpendicular cross section ("a principal cross section") set in proximity to the center of the tooth trace of the external teeth of the flexible external gear of the wave gear device is a value of $2\kappa_0 mn = 2(1+c)mn$ (deflection coefficient $\kappa_0 = 1+c$; $0<c<0.5$), which is greater than the standard 2 mn (where m is a module and n is a positive integer; and typically n=1). Moreover, by shifting the teeth in the tooth trace direction of the external teeth in a manner that takes coning into account, the straight-line portions of the rack tooth profile in axis-perpendicular cross sections in the tooth trace direction of the external teeth are conformed as viewed along the tooth trace direction. In so doing, in the wave gear device of the present invention, meshing of the teeth in a rational manner across the entire tooth trace of both gears can be attained.

To describe further, according to the present invention there is provided a wave gear device having:
  a ring-shaped rigid internal gear,
  a flexible external gear disposed inside the internal gear, and
  a wave generator fitted inside the external gear,
  the flexible external gear being equipped with a flexible cylindrical barrel portion, and a ring-shaped diaphragm extending in a radial direction from the rear end of the cylindrical barrel portion, external teeth formed in the region of a front end opening of the cylindrical barrel portion being bent into an ellipsoidal shape by the wave generator so that an amount of bending that is substantially proportional to the distance from the diaphragm is generated from the rear end portion at the diaphragm side to the front end portion at the opening side;
  characterized in that:
  the rigid internal gear and the flexible external gear are spur gears of module m;
  the respective number of teeth of the rigid internal gear and the flexible external gear is at least 200;
  the number of teeth of the flexible external gear is 2n less than the number of teeth of the rigid internal gear, where n is a positive integer;
  the basic tooth profile of the rigid internal gear and of the flexible external gear is an involute tooth profile of a pressure angle α of less than 20°;
  the flexible external gear is caused to deform into an ellipsoidal shape by the wave generator, whereby the rim-neutral circle of the external teeth of the flexible external gear deforms to a rim-neutral curve of ellipsoidal shape, the amount of bending in a radial direction with respect to the rim-neutral circle at a long axis position of the rim-neutral curve being κnm, where κ is a deflection coefficient greater than 1;

where movement loci of the external teeth of the flexible external gear with respect to the internal teeth of the rigid internal gear, obtained when meshing of the teeth is approximated by rack meshing, are derived in axis-perpendicular cross sections at positions in the tooth trace direction of the external teeth of the flexible external gear, an axis-perpendicular cross section established at a location midway between the front end portion and the rear end portion in the tooth trace direction of the external teeth of the flexible external gear is designated to be a principal cross section, the movement locus obtained in this principal cross section being termed a first movement locus, and a tangent line that, of a number of tangent lines drawn to the first movement locus in a loop-shaped apical portion on this first movement locus, is a tangent line that forms an angle equal to the pressure angle α with respect to the long axis of the rim-neutral curve being termed a first tangent line, and the movement loci obtained in axis-perpendicular cross sections in the tooth trace direction, other than the principal cross section, of the external teeth being termed second movement loci, and tangent lines that, of a number of tangent lines drawn thereto, are tangent lines that form an angle equal to the pressure angle α with respect to the long axis of the rim-neutral curve being termed second tangent lines, the tooth profile of axis-perpendicular cross sections other than the principal cross section of the external teeth is a shifted tooth profile in which the basic tooth profile comprising an involute tooth profile has undergone displacement such that the second movement loci in the axis-perpendicular cross sections are transitioned and the second tangent lines are conformed to the first tangent line, as viewed along the tooth trace direction of the external teeth; and the tips of the internal teeth of the rigid internal gear have undergone adjustment such that there is no interference with the shifted tooth profile in the tooth trace direction.

Here, in preferred practice, the tooth depth of the external teeth in the principal cross section is $2\kappa_0 mn$, where $\kappa_0$ is the deflection coefficient κ in the principal cross section, and the deflection coefficient $\kappa_0 = 1+c$ ($0<c<0.5$).

Where $\kappa_0$ ($>1$) is the deflection coefficient κ of the external teeth in the principal cross section, the amount of shift of the shifted tooth profile can be a value given by the following formula.

$$y = x\sqrt{1 - \left(\frac{2\tan\alpha/x - \sqrt{1+(2\tan\alpha)^2 - 1/x^2}}{1+(2\tan\alpha)^2}\right)^2} -$$

$$\kappa_0\sqrt{1 - \left(\frac{2\tan\alpha/\kappa_0 - \sqrt{1+(2\tan\alpha)^2 - 1/\kappa_0^2}}{1+(2\tan\alpha)^2}\right)^2} +$$

$$0.5/\tan\alpha \times \left(\sin^{-1}\frac{2\tan\alpha/x - \sqrt{1+(2\tan\alpha)^2 - 1/x^2}}{1+(2\tan\alpha)^2} -\right.$$

$$\sin^{-1}\frac{2\tan\alpha/\kappa_0 - \sqrt{1+(2\tan\alpha)^2 - 1/\kappa_0^2}}{1+(2\tan\alpha)^2} -$$

$$\frac{2\tan\alpha - x\sqrt{1+(2\tan\alpha)^2 - 1/x^2}}{1+(2\tan\alpha)^2} +$$

[NUMERIC 1]

$$\left. \frac{2\tan\alpha - \kappa_0\sqrt{1 + (2\tan\alpha)^2 - 1/\kappa_0^2}}{1 + (2\tan\alpha)^2} \right)$$

Alternatively, where the horizontal axis is the deflection coefficient κ and the vertical axis is the amount of shift y, the curve of the amount of shift obtained from the aforedescribed formula can be approximated by a straight line of constant slope, and therefore this linear approximation can be employed in specifying the amount of shift.

Next, the flexible external gear can be a uniform-depth tooth conical gear. In this case, the shape of the tip cylinder surface of the external teeth may be a conical surface of progressively smaller outside diameter from the rear end portion towards the front end portion in the tooth trace direction, such that, in an axial cross section that includes the long axis of the flexible external gear in a state of deformation into an ellipsoidal shape, the tips of the external teeth of the flexible external gear are substantially parallel to the roots of the internal teeth of the rigid internal gear.

Effect of the Invention

In the wave gear device according to the present invention, the flexible external gear undergoes positive deflection bending in which the amount of bending is greater than the regular amount of bending; the rigid internal gear and the flexible external gear have an involute tooth profile of a low pressure angle smaller than is standard; and the external teeth are shifted in such a way that straight-line portions of the involute tooth profile in axis-perpendicular cross sections of the external teeth are conformed, in the tooth trace direction of the external teeth of the flexible external gear. In so doing, meshing of the tooth profiles is achieved not only on the axis-perpendicular cross sections thereof, but in the direction of the tooth trace perpendicular thereto, whereby the desired transmission torque may be obtained even at high reduction ratios.

Consequently, according to the wave gear device of the present invention, effective meshing can be achieved in a range of the tooth trace centered on continuous meshing of the tooth profiles in the principal cross section, and leading from the principal cross section to the front end portion, as well as in the entire range of the tooth trace leading from the principal cross section to the rear end portion, and a greater amount of torque can be transmitted.

MODE FOR CARRYING OUT THE INVENTION

Constitution of Wave Gear Device

Figure 1:
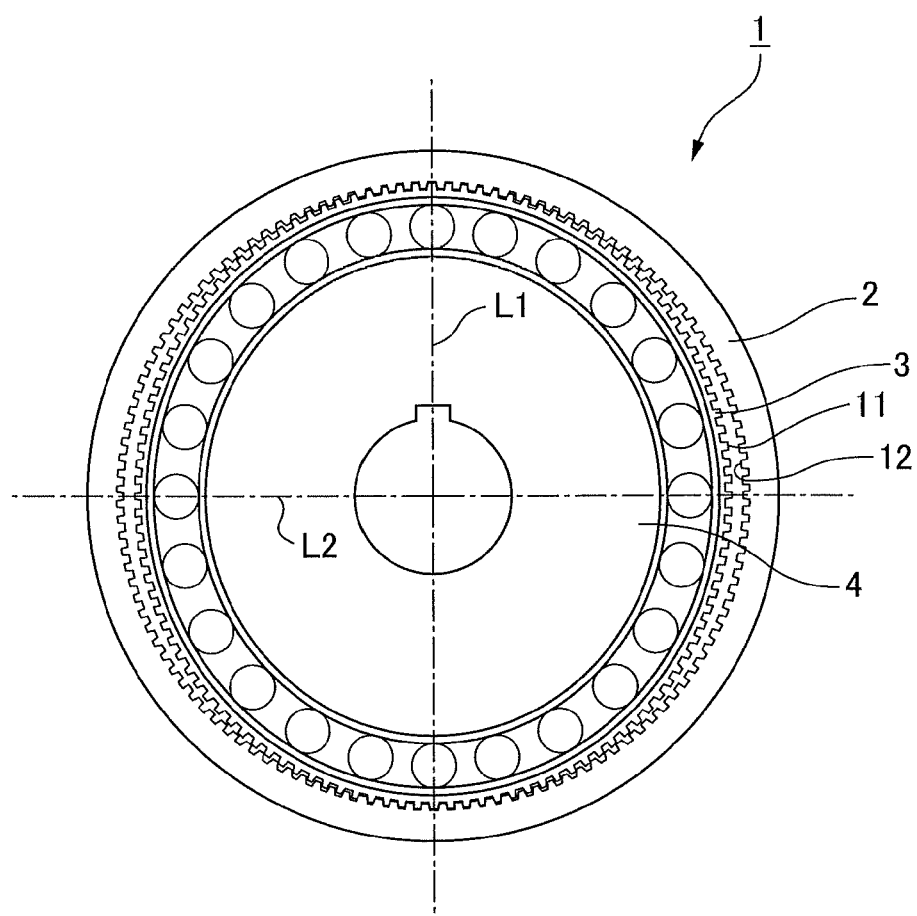
FIG. 1 is a simplified front view showing an example of a typical wave gear device.
Figure 2:
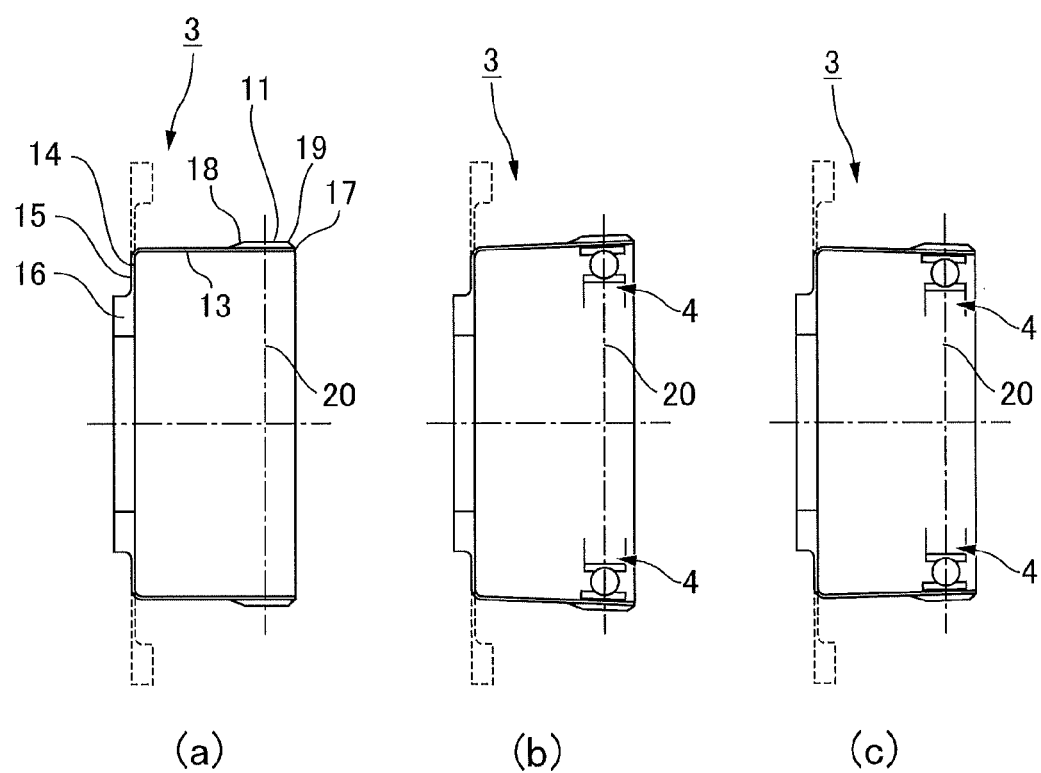
FIG. 2 is a descriptive diagram showing, in cross-section through an axis, a condition of bending of a flexible external gear of cup shape or silk hat shape, where (a) shows the state prior to deformation, (b) shows the state of a cross section that includes the long axis of the ellipse after deformation to an ellipsoidal shape, and (c) shows the state of a cross section that includes the short axis of the ellipse after deformation to an ellipsoidal shape.

FIG. 1 is a front view of a wave gear device to which the present invention is directed. FIG. 2 (a) to (c) are cross sectional views showing, in cross-section through an axis, a condition in which the opening of the flexible external gear has been bent into an ellipsoidal shape, wherein (a) shows the state prior to deformation, (b) shows a cross section that includes the long axis of the ellipse after deformation, and (c) shows a cross section that includes the short axis of the ellipse after deformation, respectively. In FIG. 2 (a) to (c), the solid lines show a flexible external gear of cup shape, and the broken lines show a flexible external gear of silk hat shape.

As shown in these drawings, the wave gear device 1 has a ring-shaped rigid internal gear 2, a flexible external gear 3 disposed to the inside thereof, and a wave generator 4 of ellipsoidal contours inserted to the inside thereof. The rigid internal gear 2 and the flexible external gear 3 are spur gears of module m, the number of teeth being 200 or more. The number of teeth of the flexible external gear is fewer than the number of teeth of the rigid internal gear by 2n, where n is a positive integer. Since, typically, n=1, the difference in tooth number is 2.

The flexible external gear 3 of the wave gear device 1 is bent into an ellipsoidal shape by the wave generator 4 of ellipsoidal contours, and in proximity to sections at both ends of the ellipsoidal shape in the long axis L1 direction, the external teeth 11 thereof mesh with the internal teeth 12 of the rigid internal gear 2. As the wave generator 4 is rotated, the positions at which the two gears 2, 3 mesh move in the circumferential direction, generating between the two gears 2, 3 relative rotation according to the tooth number difference between the two gears. The flexible external gear 3 is provided with a flexible cylindrical barrel portion 13, a diaphragm 15 that continues from the rear end 14 thereof and extends in a radial direction, and a boss 16 continuing from the diaphragm 15. External teeth 11 are formed on the outside peripheral surface section of the cylindrical barrel portion 13 at the side of an open end 17 thereof.

Due to the wave generator 4 of ellipsoidal contours that has been inserted into the inside peripheral surface section of the external tooth formation section of the cylindrical barrel portion 13, the cylindrical barrel portion 13 experiences a progressively increasing amount of bending towards the outside or towards the inside in a radial direction, towards the open end 17 from a rear end 14 on the diaphragm side. As shown in FIG. 2 (b), in a cross section that includes the long axis L1 of the ellipsoidal shape, the amount of bending to the outside progressively increases in proportion to the distance from the rear end 14 to the open end 17; and as shown in FIG. 2 (c), in a cross section that includes the short axis L2 of the ellipsoidal shape, the amount of bending to the inside progressively increases in proportion to the distance from the rear end 14 to the open end 17. Consequently, the external teeth 11 formed on the outside peripheral wall section at the open end 17 side likewise experience a progressively increasing amount of bending in proportion to the distance from the rear end 14 (the diaphragm 15), from a rear end portion 18 on the diaphragm side towards a front end portion 19 on the open end side in the tooth trace direction thereof.

Figure 3:
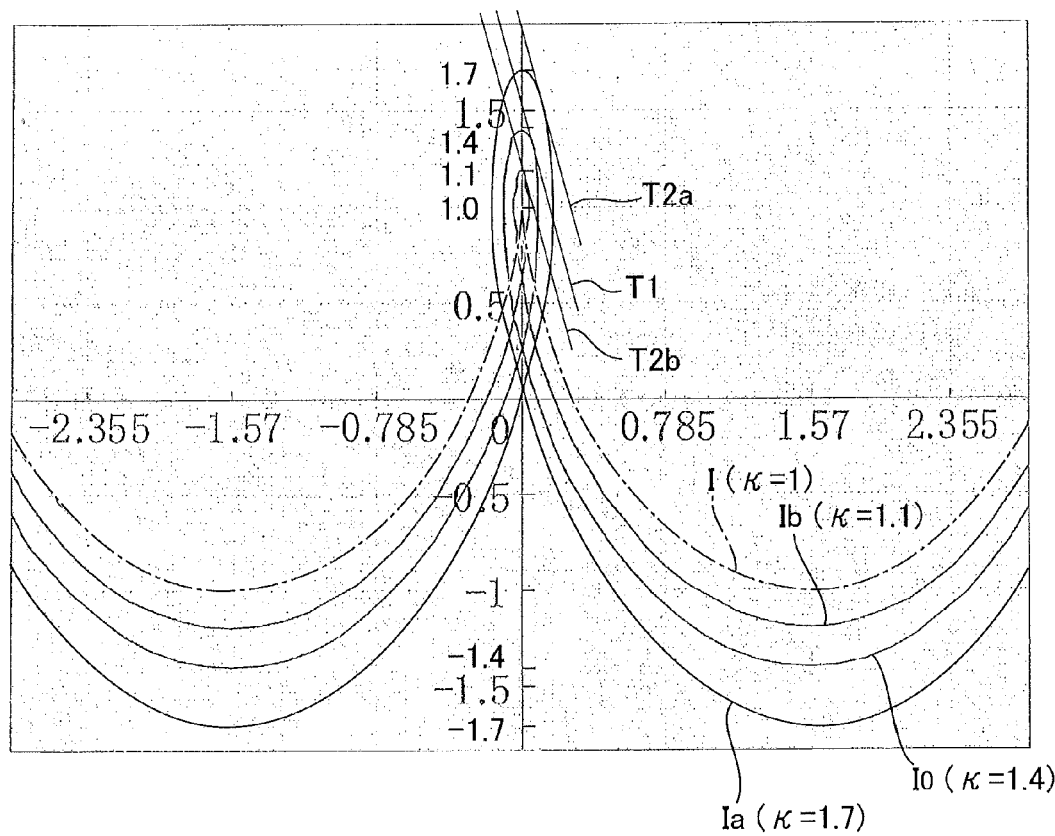
FIG. 3 is a diagram showing movement loci obtained in a case of approximation, using a rack, of relative motion of the gears in cross sections taken at three locations (a principal cross section, the front end portion, and the rear end portion) on which formation of the tooth profile of the present invention is based.

FIG. 3 is a diagram showing movement loci at points on an ellipsoidal rim-neutral curve of the external teeth 11 of the flexible external gear 3 with respect to the internal teeth 12 of the rigid internal gear 2, obtained in a case in which relative motion of the gears 2, 3 of the wave gear device 1 is approximated by a rack. In FIG. 3, the x axis shows the direction of translation of the rack, and the y axis shows a direction perpendicular thereto. The origin of the y axis is the average position of the amplitude of the movement loci. The tooth number difference between the rigid internal gear 2 and the flexible external gear 3 is 2n (n is a positive integer, and is typically 1). Where $2\kappa nm$ ($\kappa$ is the deflection coefficient, which is a real number greater than 1; and m is the module) denotes the total amplitude of the movement locus with respect to the rigid internal gear 2 in an arbitrary axis-perpendicular cross section of the flexible external gear 3, the movement locus of the external teeth 11 of the flexible external gear 3 is given by formula 1.

$$x = 0.5mn(\theta - \kappa \sin\theta)$$

$$y = \kappa \cos\theta \quad \text{(Formula 1)}$$

Assuming, for simplicity of description, that m=1 and n=1 (the tooth number differential is 2), the movement locus is as described by formula 1A. FIG. 3 shows movement loci observed in this case.

$$x = 0.5(\theta - \kappa \sin\theta)$$

$$y = \kappa \cos\theta \quad \text{(Formula 1A)}$$

(Method for Establishing Tooth Profile)

Figure 4:
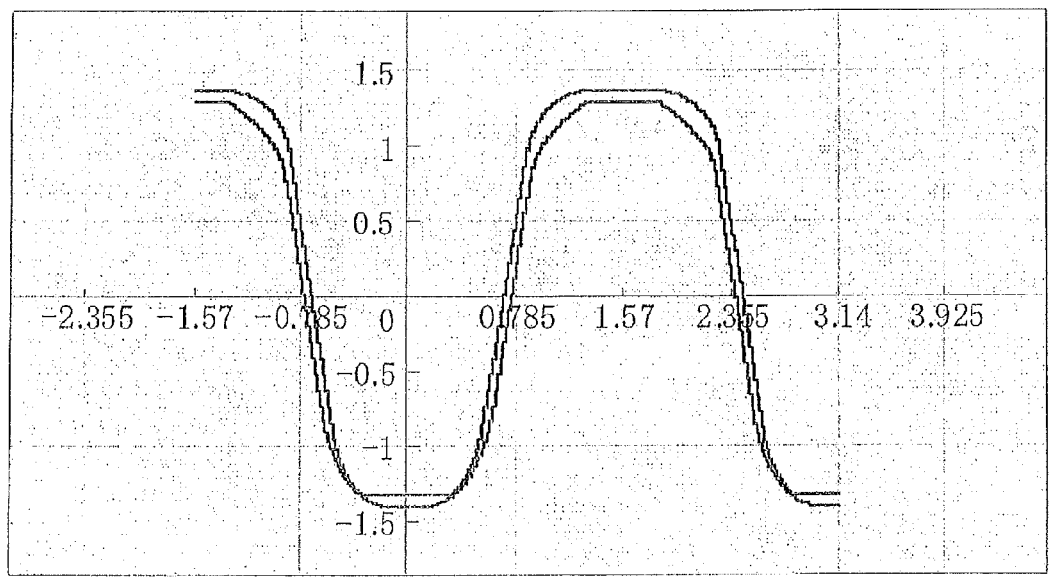
FIG. 4 is a diagram of a rack tooth profile employed in the present invention.

Next, the method for establishing tooth profiles for the external teeth 11 and the internal teeth 12 according to the present invention is described. Firstly, let an axis-perpendicular cross section of the flexible external gear 3, which cross section has been established in proximity to the center in the tooth trace direction, be designated as a principal cross section 20. FIG. 4 is a rack tooth profile shape of an involute tooth profile with a low pressure angle $\alpha$ (<20°), established in the principal cross section 20 having a deflection coefficient $\kappa_0$ in the flexible external gear 3. To prevent ratcheting, tall teeth are adopted. Specifically, in the principal cross section 20, the tooth depth is $2\kappa_0 mn = 2(1+c)mn$ (deflection coefficient $\kappa_0 = 1+c$, $0 < c < 0.5$), which is greater than the standard one of 2 mn (m is the module, n is a positive integer, and normally n=1). In this way, a rack tooth profile shape of an involute tooth profile with a low pressure angle c' is adopted as the basic tooth profile of the external teeth 11 and the internal teeth 12.

The total amplitude of the movement locus drawn by points on an ellipse-shaped rim-neutral curve of the flexible external gear 3 with respect to the rigid internal gear 2 in this principal plane 20 shall be denoted as $2\kappa_0 mn$ (positive deflection of $\kappa_0 > 1$). The total amplitude of the movement locus drawn by points on an ellipsoidal rim-neutral curve at the front end portion 19 in the tooth trace direction of the external teeth 11 shall be denoted as $2(\kappa_0 + a)mn$, and the total amplitude of the movement locus drawn by points on an ellipse-shaped rim-neutral curve at the rear end portion 18 in the tooth trace direction of the external teeth 11 shall be denoted as $2(\kappa_0 - b)mn$. Due to coning, the cylindrical barrel portion 13 of the flexible external gear 3 experiences an increasing amount of bending in proportion to the distance from the diaphragm 15, and therefore a and b can be defined as follows, where the distances from the diaphragm 15 to the front end portion 19, to the principal cross section 20, and to the rear end portion 18 are respectively denoted as Ia, $I_0$, and Ib.

$$a = \kappa_0 (Ia - I_0)/I_0$$

$$b = \kappa_0 (I_0 - Ib)/I_0$$

Referring again to FIG. 3 in the description, a curve $I_0$ shows the movement locus in the principal cross section 20 of the teeth prior to shifting; in the principal cross section 20, bending occurs at a deflection coefficient $\kappa = \kappa_0$ (=1+c, 0<c<0.5). A curve Ia shows the movement locus in the front end portion 19 of the teeth prior to shifting; in the cross section of the front end portion 19, bending occurs at a deflection coefficient $\kappa = \kappa_0 + a$. A curve Ib shows the movement locus in the rear end portion 18 of the teeth prior to shifting; in the cross section of the rear end portion 18, bending occurs at a deflection coefficient $\kappa = \kappa_0 - b$ (>1). This would be a case in which, for example, curve $I_0$ has a deflection coefficient $\kappa = \kappa_0 = 1.4$ (c=0.4), curve Ia has a coefficient $\kappa = 1.7$ (a=0.3), and curve Ib has a coefficient $\kappa = 1.1$ (b=0.3). A curve I, shown by a single-dot and dash line, is the movement locus in a case of standard deflection bending ($\kappa = 1$). In this way, the movement loci Ia, Ib, and $I_0$ constitute positive deflection bending, and therefore loop-shaped apical portions are formed in the apical sections which are the portions of deepest meshing thereof.

Next, in the loop-shaped apical portion on the movement locus $I_0$ obtained in the principal cross section 20, there is drawn to the movement locus $I_0$ a tangent line such that the angle of the tangent line with respect to the long axis of the rim-neutral curve (the y axis in FIG. 3) is equal to the pressure angle $\alpha$ (<20°); this is designated as a first tangent line T1. For the loop-shaped apical portion of the movement locus obtained in each of axis-perpendicular cross sections, other than the principal cross section 20, in the tooth trace direction of the external teeth 11, there is drawn a tangent line such that the angle of the tangent line with respect to the long axis of the rim-neutral curve is equal to the pressure angle $\alpha$; these are respectively designated as second tangent lines T2. For example, in FIG. 3, a second tangent line T2a is obtained in the loop-shaped apical portion of the movement locus Ia of the front end portion 19, and a second tangent line T2b is obtained in the loop-shaped apical portion of the movement locus Ib of the rear end portion 18.

Next, the tooth profile of each of the axis-perpendicular cross sections, other than the principal cross section 20, of the external teeth 11 is imparted with a shifted tooth profile in which a basic tooth profile comprising a rack tooth profile shape of an involute tooth profile has undergone displacement, such that the movement locus in the each of the axis-perpendicular cross sections of the external teeth 11 is transitioned and the second tangent lines T2 are conformed to the first tangent line T1, as viewed along the tooth trace direction of the external teeth 11.

The amount of shift necessary at this time is given by formula (2).

[NUMERIC 2]

$$y = x\sqrt{1 - \left(\frac{2\tan\alpha/x - \sqrt{1+(2\tan\alpha)^2 - 1/x^2}}{1+(2\tan\alpha)^2}\right)^2} -$$

$$\kappa_0\sqrt{1 - \left(\frac{2\tan\alpha/\kappa_0 - \sqrt{1+(2\tan\alpha)^2 - 1/\kappa_0^2}}{1+(2\tan\alpha)^2}\right)^2} +$$

$$0.5/\tan\alpha \times \left(\sin^{-1}\frac{2\tan\alpha/x - \sqrt{1+(2\tan\alpha)^2 - 1/x^2}}{1+(2\tan\alpha)^2} - \right.$$

$$\sin^{-1}\frac{2\tan\alpha/\kappa_0 - \sqrt{1+(2\tan\alpha)^2 - 1/\kappa_0^2}}{1+(2\tan\alpha)^2} -$$

$$\frac{2\tan\alpha - x\sqrt{1+(2\tan\alpha)^2 - 1/x^2}}{1+(2\tan\alpha)^2} +$$

$$\left.\frac{2\tan\alpha - \kappa_0\sqrt{1+(2\tan\alpha)^2 - 1/\kappa_0^2}}{1+(2\tan\alpha)^2}\right)$$

Formula (2)

Figure 5:
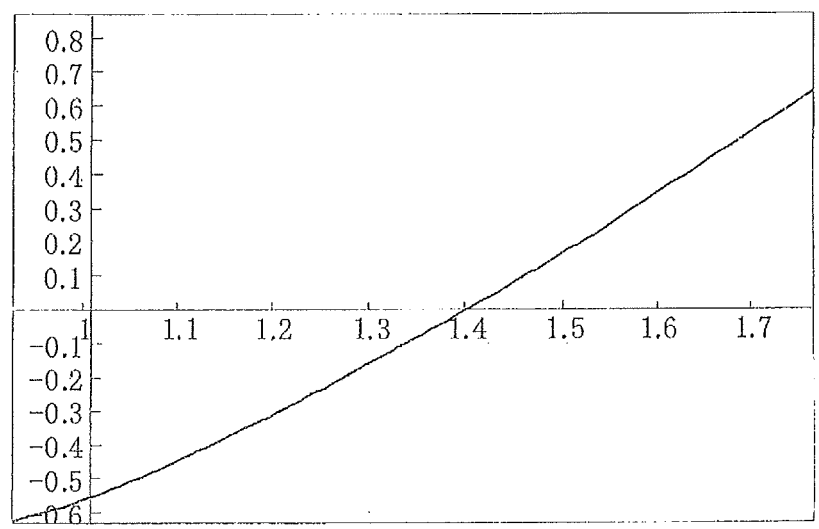
FIG. 5 is a graph showing amounts of shift at positions in the tooth trace direction of a flexible external gear.

FIG. 5 is a graph showing amounts of shift at positions along the tooth trace of a flexible external gear, and shows an example of the aforedescribed formula 2. The horizontal axis in the drawing shows a value equal to the amount of bending w of the external teeth 11 of the flexible external gear 3 in a radial direction of the axis-perpendicular cross sections, divided by mn (the deflection coefficient κ); while the vertical axis shows the amount of shift y. In practical terms, because this curve is close to a straight line, the amount of shift can be defined by a straight line approximating the curve.

Figure 6:
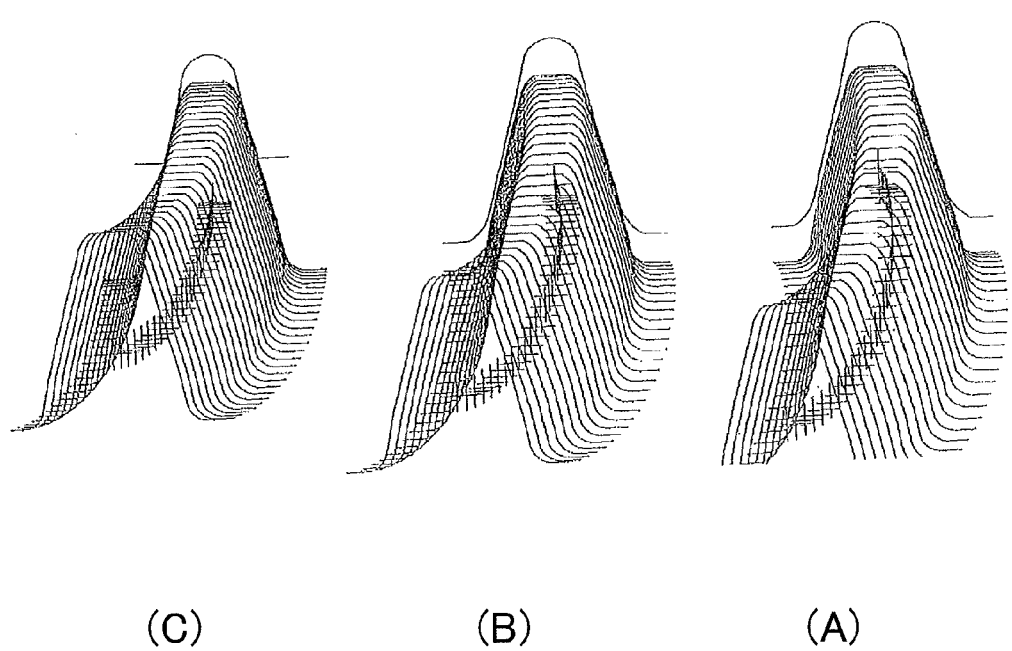
FIGS. 6 (A), (B), and (C) are descriptive diagrams respectively showing meshing of the flexible external gear and the rigid internal gear in the front end section, the principal cross section, and the rear end portion in the tooth trace direction of the external teeth, in each case showing a state in which the gears share a common straight-line portion cross section.

FIGS. 6 (A), (B), and (C) show meshing of the external teeth 11 with the internal teeth 12 of the rigid internal gear 2 in the front end portion 19, the principal cross section 20, and the rear end portion 18, obtained in this manner. In each case, a state in which the tooth profiles of the gears 2 and 3 share a common tooth profile in straight-line portions thereof. Thus, according to the present invention, a state in which the external teeth 11 of the flexible external gear 3 mesh with the internal teeth 12 is formed in each of cross sections taken in the tooth trace direction, from the front end portion 19 through the principal cross section 20 and to the rear end portion 18.

Figure 7:
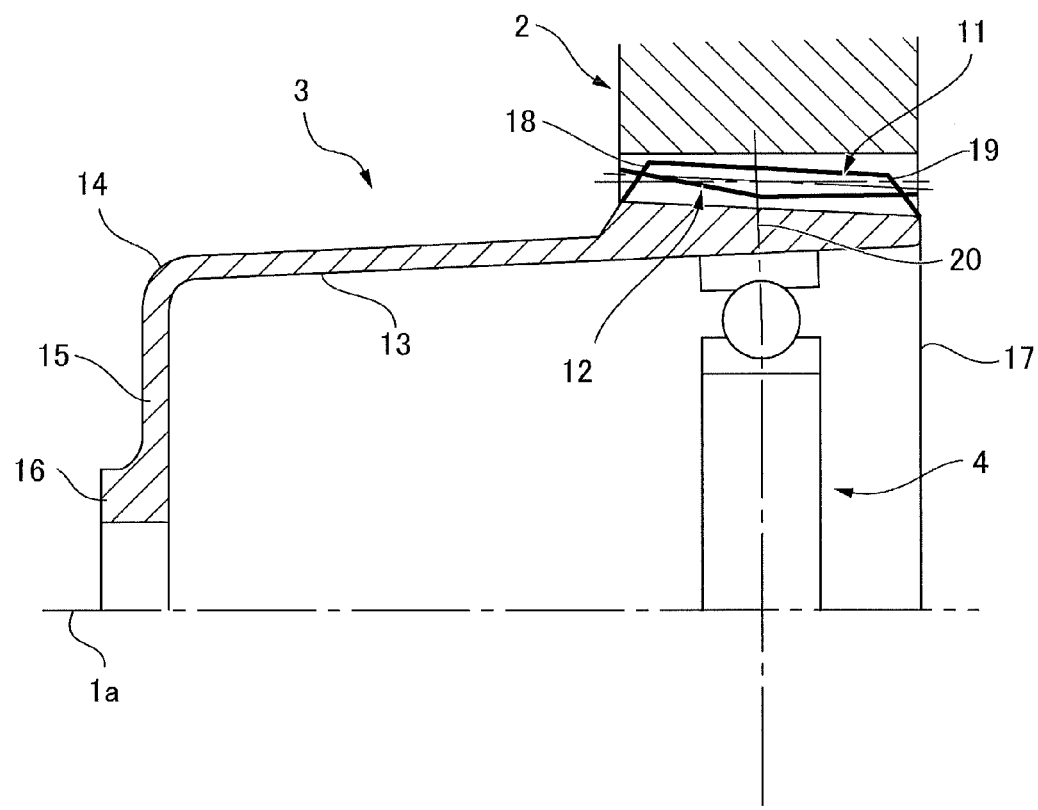
FIG. 7 is a descriptive diagram showing the shapes of teeth of the flexible external gear and the rigid internal gear.

FIG. 7 shows an example of the shape of the teeth of the flexible external gear 3 and the rigid internal gear 2 having tooth profiles formed in the aforedescribed manner, and is a longitudinal cross sectional view of a case of cross section cut to include the center axis 1a of the gears, and the long axis of the flexible external gear 3 when deformed to an ellipsoidal shape. As shown in FIG. 7, the tips of the internal teeth 12 of the rigid internal gear 2 have undergone adjustment along the tooth trace direction thereof, such that there is no interference with the shifted tooth profile of the external teeth 11. Specifically, the tips of the internal teeth 12 have undergone adjustment in the tooth trace direction thereof, such that the tooth depth progressively decreases towards the end of the rear end portion 18 side from a position corresponding to the principal cross section 20 of the external teeth 11.

In preferred practice, the flexible external gear 3 is a uniform-depth tooth conical gear. In this case, in preferred practice, the shape of the tip cylinder surface of the external teeth 11 is a conical surface of progressively smaller outside diameter from the rear end portion 18 towards the front end portion 19 in the tooth trace direction, such that, in an axial cross section that includes the long axis of the flexible external gear 3 in a state of deformation into an ellipsoidal shape, the tips of the external teeth 11 of the flexible external gear 3 are substantially parallel to the roots of the internal teeth 12 of the rigid internal gear 2.

KEY

1 Wave gear device
1a Center axis
2 Rigid internal gear
3 Flexible external gear
4 Wave generator
11 External teeth
12 Internal teeth
13 Cylindrical barrel portion
14 Rear end
15 Diaphragm
16 Boss
17 Open end
18 Rear end portion
19 Front end portion
20 Principal cross section
I Movement locus of standard deflection bending
$I_0$ Movement locus of positive deflection bending in principal cross section
Ia Movement locus of positive deflection bending in front end portion
Ib Movement locus of positive deflection bending in rear end portion
T1 First tangent line
T2a, T2b Second tangent lines

The invention claimed is:

1. A wave gear device having a ring-shaped rigid internal gear, a flexible external gear disposed inside the internal gear, and a wave generator fitted inside the external gear,
   the flexible external gear being equipped with a flexible cylindrical barrel portion, and a ring-shaped diaphragm extending in a radial direction from a rear end of the cylindrical barrel portion, external teeth formed in a region of a front end opening of the cylindrical barrel portion being bent into an ellipsoidal shape by the wave generator so that an amount of bending that is substantially proportional to a distance from the diaphragm is generated from a rear end portion at a diaphragm side to a front end portion at an opening side;
   wherein the wave gear device is characterized in that:
   the rigid internal gear and the flexible external gear are spur gears of module m;
   the number of teeth of the rigid internal gear and of the flexible external gear is at least 200;
   the number of teeth of the flexible external gear is 2n less than the number of teeth of the rigid internal gear, where n is a positive integer;
   a basic tooth profile of the rigid internal gear and of the flexible external gear is an involute tooth profile of a pressure angle α of less than 20°;
   the flexible external gear is caused to deform into an ellipsoidal shape by the wave generator, whereby a rim-neutral circle of the external teeth of the flexible external gear deforms to a rim-neutral curve of ellipsoidal shape, an amount of bending in a radial direction with respect to the rim-neutral circle at a long axis position of the rim-neutral curve being κnm, where κ is a deflection coefficient greater than 1;
   where movement loci of the external teeth of the flexible external gear with respect to internal teeth of the rigid internal gear, obtained when meshing of the teeth is approximated by rack meshing, are derived in axis-perpendicular cross sections at positions in a tooth trace direction of the external teeth of the flexible external gear, an axis-perpendicular cross section established at a location midway between the front end portion and the rear end portion in the tooth trace direction of the external teeth of the flexible external gear is designated to be a principal cross section, the movement locus obtained in this principal cross section being termed a first movement locus, and a tangent line that, of a number of tangent lines drawn to the first movement locus in a loop-shaped apical portion on this first movement locus, is a tangent line that forms an angle equal to the pressure angle α with respect to the long axis of the rim-neutral curve, being termed a first tangent line, and the movement loci obtained in axis-perpendicular cross sections in the tooth trace direction, other than the principal cross section, of the external teeth being termed second movement loci, and tangent lines that, of a number of tangent lines drawn thereto, are tangent lines that form an angle equal to the pressure angle α with respect to the long axis of the rim-neutral curve being termed second tangent lines, a tooth profile of axis-perpendicular cross sections other than the principal cross section of the external teeth is a shifted tooth profile in which the basic tooth profile comprising an involute tooth profile has undergone displacement such that the second movement loci in the axis-perpendicular cross sections are transitioned and the second tangent lines are conformed to the first tangent line, as viewed along the tooth trace direction of the external teeth; and tips of the internal teeth of the rigid internal gear have undergone adjustment such that there is no interference with the shifted tooth profile in the tooth trace direction.

2. The wave gear device according to claim 1, wherein a tooth depth of the external teeth in the principal cross section is $2\kappa_0 mn$, where $\kappa_0$ is the deflection coefficient κ in the principal cross section, and the deflection coefficient $\kappa_0$ is 1+c (0<c<0.5).

3. The wave gear device according to claim 1, wherein where $\kappa_0$ (>1) is the deflection coefficient κ of the external teeth in the principal cross section, the amount of shift of the shifted tooth profile is a value given by the following formula, or a value specified by a straight line of constant slope approximating the curve of the amount of shift obtained from the following formula, where a horizontal axis is the deflection coefficient κ and a vertical axis is the amount of shift y

[NUMERIC 1]
$$y = x\sqrt{1 - \left(\frac{2\tan\alpha/x - \sqrt{1+(2\tan\alpha)^2 - 1/x^2}}{1+(2\tan\alpha)^2}\right)^2} -$$

$$\kappa_0\sqrt{1 - \left(\frac{2\tan\alpha/\kappa_0 - \sqrt{1+(2\tan\alpha)^2 - 1/\kappa_0^2}}{1+(2\tan\alpha)^2}\right)^2} +$$

$$0.5/\tan\alpha \times \left(\sin^{-1}\frac{2\tan\alpha/x - \sqrt{1+(2\tan\alpha)^2 - 1/x^2}}{1+(2\tan\alpha)^2} - \right.$$

$$\sin^{-1}\frac{2\tan\alpha/\kappa_0 - \sqrt{1+(2\tan\alpha)^2 - 1/\kappa_0^2}}{1+(2\tan\alpha)^2} -$$

$$\frac{2\tan\alpha - x\sqrt{1+(2\tan\alpha)^2 - 1/x^2}}{1+(2\tan\alpha)^2} +$$

$$\left.\frac{2\tan\alpha - \kappa_0\sqrt{1+(2\tan\alpha)^2 - 1/\kappa_0^2}}{1+(2\tan\alpha)^2}\right).$$

4. The wave gear device according to claim 1, wherein the flexible external gear is uniform-depth tooth conical gear, and a shape of a tip cylinder surface of the external teeth is a conical surface of progressively smaller outside diameter from the rear end portion towards the front end portion in the tooth trace direction, such that, in an axial cross section that includes the long axis of the flexible external gear in a state of deformation into an ellipsoidal shape, the tips of the external teeth of the flexible external gear are substantially parallel to roots of the internal teeth of the rigid internal gear.

* * * * *